United States Patent [19]

Beach et al.

[11] Patent Number: 5,352,283
[45] Date of Patent: Oct. 4, 1994

[54] JET INKS AVOIDING SOLID FORMATION

[75] Inventors: Bradley L. Beach; Ashok V. Gangal; James M. Mrvos; Ann M. Piekunka, all of Lexington; Jerry F. Stone, Georgetown, all of Ky.

[73] Assignee: Lexmark International, Inc., Greenwich, Conn.

[21] Appl. No.: 93,520

[22] Filed: Jul. 19, 1993

Related U.S. Application Data

[63] Continuation of Ser. No. 872,738, Apr. 22, 1992, abandoned.

[51] Int. Cl.$^5$ .............................................. C09D 11/02
[52] U.S. Cl. ................................................. 106/22 H
[58] Field of Search ...................................... 106/22 H

[56] References Cited

U.S. PATENT DOCUMENTS

| | | | |
|---|---|---|---|
| 4,197,135 | 4/1980 | Bailey et al. | 106/23 R |
| 4,789,400 | 12/1988 | Solodar et al. | 106/22 H |
| 4,973,992 | 11/1990 | Owatari | 346/140 R |
| 5,017,644 | 5/1991 | Fuller | 524/612 |
| 5,049,188 | 9/1991 | Takimoto et al. | 106/20 R |
| 5,062,892 | 11/1991 | Halko | 106/22 H |
| 5,098,476 | 3/1992 | Baker | 106/22 H |
| 5,223,028 | 6/1993 | Aulick et al. | 106/22 H |

FOREIGN PATENT DOCUMENTS 11152176 10/1987 Japan .

*Primary Examiner*—Helene Klemanski
*Attorney, Agent, or Firm*—John A. Brady

[57] ABSTRACT

Hydroxyethylated polyethyleneimine is added to jet ink having an anionic dye to prevent whisker forming overnight. To avoid excessive viscosity at start-up, the polyethyleneimine is low molecular weight or a low molecular weight hydroxyethylated amine is combined with high molecular weight polyethyleneimine.

34 Claims, No Drawings

JET INKS AVOIDING SOLID FORMATION

This application is a continuation of application Ser. No. 07/872,738, filed Apr. 22, 1992, now abandoned.

TECHNICAL FIELD

This invention relates to aqueous liquid ink applied from nozzles, commonly termed jet inks. Previous jet inks having dyes soluble at basic pH tend to form solids spontaneously during rest. These solids are initially in the form of strands or whiskers extending from nozzle holes and the solids can grow to completely block the nozzle holes. This invention is directed to formulations having ingredients selected to avoid such solid formation.

BACKGROUND OF THE INVENTION

This invention employs an ingredient known to improve waterfastness in printing of the jet ink to which it is added, that ingredient being either at a low molecular weight or in combination with a low molecular weight amine. That essential ingredient is hydroxyalkylated polyethyleneimine, preferably hydroxyethylated polyethyleneimine (HEPEI).

No novelty is claimed for the use of hydroxyalkylated polyethyleneimine itself in such inks, and U.S. Pat. Nos. 4,197,135 to Bailey; 4,789,400 to Solodar et al; and 5,017,644 to Fuller et al (Example XIII) disclose such use. The results may not be entirely satisfactory since the hydroxyethylation tends to reduce the effectiveness as a waterfastness aid.

This invention is directed to the elimination of solid whiskers which form spontaneously during inactivity of the ink. No prior art suggestion is known to employ a polyethyleneimine for such purpose. Indeed, no prior art expressly directed to solving the problem of such solid formation is known, although certain ink formulas with pH sensitive dyes have less tendency to solid formation. The common factor in such formulas appears to be that they have at least two dissimilar dyes present in major proportions.

Although this invention is not considered dependent on any factor of the ink formula other than the dye being base soluble, some details of a commercially suitable formula are given. Illustrative prior teachings of various ingredients of that formula are the following: U.S. Pat. Nos. 5,098,476 to Baker illustrating use of 2-pyrrolidone as a co-solvent; 5,062,892 to Halko disclosing buffers such as used in the formulation; 5,049,188 to Takimoto et al and 4,973,992 to Owatari mentioning amines as additives to jet inks.

DISCLOSURE OF THE INVENTION

A hydroxy alkyl substituted polyethyleneimine in small amounts is added to jet ink formulations having an anionic dye and the mobility of that additive is controlled either by the addition of a low molecular weight, perhydroxyalkyl substituted amine to now currently available hydroxyethylated polyethyleneimine (HEPEI), which has a weight average molecular weight of about 4000, or by use of HEPEI of weight average molecular weight of about 1200, preferably 600, but at least less than 2000. These imines are per (substantially fully substituted) hydroxyethylated to assure satisfactory ink shelf life.

The HEPEI is an amount not more than 0.4 percent by weight of the jet ink. Where the HEPEI is of weight average molecular weight greater than 2000, ink mobility is controlled by the addition of a perhydroxy substituted amine of molecular weight less than 1000.

Occurrence of whiskers and other solidification upon rest, such as non-use overnight, is virtually eliminated. Although the mechanism is not known with certainty, the imine sites of the HEPEI would be protonated in the vehicle, which is basic to dissolve an anionic dye. At the same time the acid sites of the dye, which are typically sulfonic and/or carboxylic, necessarily have an ionic affinity to the protonated imine site. Thus, the two are pulled physically together and the physical presence of the HEPEI prevents the dye molecules from forming a recurring pattern in the nature of crystallization. The whiskers and other such solid formation appear crystalline, although they are soft.

BEST MODE FOR CARRYING OUT THE INVENTION

The best mode contemplated is by employing the 1200 weight average molecular weight HEPEI. However, owing to the lack of availability of such low molecular weight HEPEI such an embodiment has not been fully implemented. To implement such an embodiment the following ingredients are combined in any order and mixed.

| LOW MW HEPEI FORMULA | |
|---|---|
| Ingredient | Approximate Amount (By Weight) |
| 1) Anionic dye or dyes | 1.5–3.0 |
| 2) 2-Pyrrolidone | 7.5 |
| 3) Perhydroxyethylated polyethyleneimine (Wt. Ave. MW 1200) | 0.033–0.2 (0.1 preferred) |
| 4) Sodium salt of weak acid buffers | 0.5 |
| 5) 2-hydroxyethoxy ethanol wetting agent | 0.1 |
| 6) Glycerol wetting agent | 1.0 |
| 7) Proxel GXL (trademark) biocide | 0.2 |
| 8) Tetrasodiumethylenediamine tetraacetric acid chelant | 0.2 |
| 9) De-ionized Water | 87.9 |
| 10) Ammonium hydroxide bringing pH to 8.7 | 0.1–0.28 |

Upon thorough mixing by stirring the foregoing ink would function properly regardless of overnight inactivity and does not form solids. This is particularly important where only one dye predominates since the tendency of one-dye inks to form solids seemingly growing out of ink jet nozzles is strong. This ink would function as a thermal ink jew ink.

| HIGH MW HEPEI FORMULA | |
|---|---|
| Ingredient | Amount (By Weight) |
| 1) Dye (see below) | 1.75 |
| 2) 2-Pyrrolidone | 7.5 |
| 3) Perhydroxyethylated polyethyleneimine (Wt. Ave. MW 4000) | 0.033 |
| 4) Triethanolamine (TEA) | 0.5 |
| 5) Sodium phosphate (buffer) | 0.25 |
| 6) Sodium tetraborate (buffer) | 0.25 |
| 7) 2-hydroxyethoxy ethanol (wetting agent) | 0.1 |
| 8) Glycerol (wetting agent) | 1.0 |
| 9) Proxel GXL biocide | 0.2 |
| 10) Tetrasodium ethylenediamine tetraacetic acid chelant | 0.2 |
| 11) Decontaminants/surfactants/special | — |

| HIGH MW HEPEI FORMULA | |
|---|---|
| Ingredient | Amount (By Weight) |
| coloring, etc. for specific requirements | |
| 12) De-ionized water | 88.0 |
| 13) Ammonium hydroxide to bring pH to 8.7 | 0.1–0.25 |

Dye

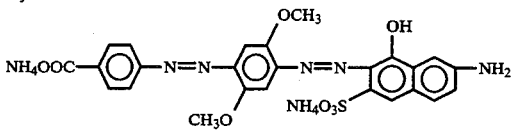

Upon thorough mixing by stirring the foregoing ink functions very well regardless of overnight inactivity and does not form solids.

N,N,N'N'-tetrakis (2-hydroxypropyl)-ethylenediamine (HPED) functions very well as an alternative to the TEA. Both the TEA and HPED are alkyloxy substituted amines, which is very similar chemically to the HEPEI, with the amines being of much lower molecular weight.

The functioning in both formulas is conventional, as follows: The ammonia is a volatile cation which escapes at printing to leave the dyes in their acid form, and therefore, non-water-soluble form. The 2-pyrrolidone is a co-solvent for the dyes and a humectant. The other ingredients function conventionally as indicated in the formula.

During whisker formation, the 2-pyrrolidone tends to complex with the dye and then be separated from the dye, since the resulting solids are found to be coated by the 2-pyrrolidone.

The ink requires materials, for example the dye, to have a high degree of purity to prevent kogation, which is the formation of deposits from the ink on the heaters of the thermal ink jet printheads. Creation of the whiskers is a separate phenomenon, which is encouraged by the high purity but which is avoided in accordance with this invention by the alkyloxy imines.

While the whisker deposits are prevented when using low concentrations (<0.1% by weight) of high molecular weight alkyloxy imines, the dye-imine complex creates a high start-up viscosity. This condition causes print voids in the first one to three lines of text when a thermal jet printer holding the ink is idle overnight. The low molecular weight TEA and HPED used alone require high amounts (>0.75% by weight) to eliminate the whisker formation and such amounts in the final printing degrade waterfastness.

The mixture of the high molecular weight imine and low molecular weight amine provides optimized performance with respect to nozzle deposits, nozzle start-up, and waterfastness. The 1200 molecular weight HEPEI is a molecule significantly larger than the dye, so the smaller molecular weight impairs neither its function of preventing whisker formation nor its function of aiding waterfastness of printing, while the mobility at start of use would be higher because that is a function of the size of a complex of the dye and the imine.

The foregoing ink was actually developed for a special purpose and would include special ingredients as indicated at 11 in the high molecular weight formula, but in amounts not significant to the weight proportions of that formula or to its function as described in the foregoing.

Modifications and extensions will be apparent. In particular propyloxy and other alkyloxy substituents are clear potential alternatives to the ethyloxy substituents in the added imines. Other polar solvents, such as a water-alcohol mixture, are alternatives to water solvents.

We claim:

1. A liquid ink composition comprising a dye having anionic solubilizing groups, a polar solubilizing liquid providing a liquid vehicle for said dye in said ink, and a hydroxy alkyl substituted polyethyleneimine of weight average molecular weight of about 2000 or less, said polyethyleneimine being in an amount of not more than 0.3 percent by weight of said ink and being in sufficient amount to prevent solid formation in said ink which would otherwise occur after extended rest of said ink.

2. The ink as in claim 1 in which said dye consists of predominantly only a single dye.

3. The ink as in claim 2 in which said substituted polyethyleneimine is perhydroxyethylated.

4. The ink as in claim 1 in which said substituted polyethyleneimine is perhydroxyethylated.

5. The ink as in claim 4 in which said molecular weight is about 600.

6. The ink as in claim 3 in which said molecular weight is about 600.

7. The ink as in claim 6 in which said dye is about 1.5–3.0 parts by weight and said polyethyleneimine is about 0.033 to 0.2 parts by weight per 100 parts by weight of said ink.

8. The ink as in claim 5 in which said dye is about 1.5–3.0 parts by weight and said polyethyleneimine is about 0.033 to 0.2 parts by weight per 100 parts by weight of said ink.

9. A liquid ink composition comprising a dye having anionic solubilizing groups, a polar solubilizing liquid providing a liquid vehicle for said dye and said ink, a hydroxy alkyl substituted polyethyleneimine of weight average molecular weight greater than 2000, said polyethyleneimine being in an amount of not more than 0.3 percent by weight of said ink an da perhydroxyalkyl substituted amine of molecular weight less than 1000, the molecular weight of said polyethyleneimine and the proportions of said polyethyleneimine and said amine being in amount to substantially eliminate voids in printing from said ink from high start-up viscosity while preserving waterfastness of printing from said ink, said ink having operating viscosity after extended rest.

10. The ink as in claim 9 in which said dye consists of predominantly only a single dye.

11. The ink as in claim 10 in which said substituted polyethyleneimine is perhydroxyethylated.

12. The ink as in claim 9 in which said substituted polyethyleneimine is perhydroxyethylated.

13. The ink as in claim 12 in which said amine of molecular weight less than 1000 is triethanolamine.

14. The ink as in claim 11 in which said amine of molecular weight less than 1000 is triethanolamine.

15. The ink as in claim 11 in which said amine of molecular weight less than 1000 is N,N,N'N'-tetrakis(2-hydroxypropyl)-ethylenediamine.

16. The ink as in claim 12 in which said amine of molecular weight less than 1000 is N,N,N'N'-tetrakis(2-hydroxypropyl)-ethylenediamine.

17. The ink as in claim 16 in which said molecular weight of said polyethyleneimine is about 4000.

18. The ink as in claim 11 in which said molecular weight of said polyethyleneimine is about 4000.

19. The ink as in claim 12 in which said molecular weight of said polyethyleneimine is about 4000.

20. The ink as in claim 13 in which said molecular weight of said polyethyleneimine is about 4000.

21. The ink as in claim 14 in which said molecular weight of said polyethyleneimine is about 4000.

22. The ink as in claim 15 in which said molecular weight of said polyethyleneimine is about 4000.

23. The ink in claim 22 in which said dye is about 1.75 parts by weight and said polyethyleneimine is about 0.033 parts by weight per 100 parts by weight of said ink.

24. The ink in claim 11 in which said dye is about 1.75 parts by weight and said polyethyleneimine is about 0.033 parts by weight per 100 parts by weight of said ink.

25. The ink in claim 12 in which said dye is about 1.75 parts by weight and said polyethyleneimine is about 0.033 parts by weight per 100 parts by weight of said ink.

26. The ink in claim 13 in which said dye is about 1.75 parts by weight and said polyethyleneimine is about 0.033 parts by weight per 100 parts by weight of said ink.

27. The ink in claim 14 in which said dye is about 1.75 parts by weight and said polyethyleneimine is about 0.033 parts by weight per 100 parts by weight of said ink.

28. The ink in claim 15 in which said dye is about 1.75 parts by weight and said polyethyleneimine is about 0.033 parts by weight per 100 parts by weight of said ink.

29. The ink in claim 16 in which said dye is about 1.75 parts by weight and said polyethyleneimine is about 0.033 parts by weight per 100 parts by weight of said ink.

30. The ink in claim 17 in which said dye is about 1.75 parts by weight and said polyethyleneimine is about 0.033 parts by weight per 100 parts by weight of said ink.

31. The ink in claim 18 in which said dye is about 1.75 parts by weight and said polyethyleneimine is about 0.033 parts by weight per 100 parts by weight of said ink.

32. The ink in claim 19 in which said dye is about 1.75 parts by weight and said polyethyleneimine is about 0.033 parts by weight per 100 parts by weight of said ink.

33. The ink in claim 20 in which said dye is about 1.75 parts by weight and said polyethyleneimine is about 0.033 parts by weight per 100 parts by weight of said ink.

34. The ink in claim 21 in which said dye is about 1.75 parts by weight and said polyethyleneimine is about 0.033 parts by weight per 100 parts by weight of said ink.

* * * * *